(12) United States Patent
Kim et al.

(10) Patent No.: US 9,063,273 B2
(45) Date of Patent: Jun. 23, 2015

(54) CHANGEABLE LIQUID PRISM ARRAY

(75) Inventors: Eok-su Kim, Seongnam-si (KR);
Jung-mok Bae, Seoul (KR); Hoon Song, Yongin-si (KR); Kang-hee Won, Seoul (KR); Deuk-seok Chung, Yongin-si (KR); Kyu-hwan Choi, Yongin-si (KR); Yoon-sun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 13/617,093

(22) Filed: Sep. 14, 2012

(65) Prior Publication Data
US 2013/0208370 A1    Aug. 15, 2013

(30) Foreign Application Priority Data
Feb. 13, 2012    (KR) .................. 10-2012-0014406

(51) Int. Cl.
  *G02B 5/06* (2006.01)
  *G02B 5/04* (2006.01)
  *G02B 26/00* (2006.01)
  *G02B 26/08* (2006.01)
(52) U.S. Cl.
  CPC *G02B 5/06* (2013.01); *G02B 5/045* (2013.01); *G02B 26/005* (2013.01); *G02B 26/0883* (2013.01)

(58) Field of Classification Search
None
See application file for complete search history.

(56) References Cited

U.S. PATENT DOCUMENTS

| 6,424,786 B1 | 7/2002 | Beeson et al. | |
| 7,715,106 B2 * | 5/2010 | Li et al. | 359/665 |
| 2007/0058094 A1 * | 3/2007 | Kuiper et al. | 349/1 |

* cited by examiner

*Primary Examiner* — Jade R Chwasz
(74) *Attorney, Agent, or Firm* — NSIP Law (57) ABSTRACT

A changeable liquid prism array and a method of manufacturing the changeable liquid prism array are provided. The changeable liquid prism array includes a substrate, a wiring layer formed on the substrate, and including conducting wire portions and non-conducting wire portions where the conducting wire portions are not formed, and barrier walls disposed on the wiring layer. The changeable liquid prism array further includes cells defined by the barrier walls, a first liquid included in the cells, and a second liquid located on the first liquid. The changeable liquid prism array further includes side electrodes disposed on side surfaces of the barrier walls, and separated from each other by spaces corresponding to the non-conducting wire portions, and an upper electrode arranged above the barrier walls, and separated from the side electrodes.

10 Claims, 10 Drawing Sheets

BACK EXPOSURE

FIG. 12

CHANGEABLE LIQUID PRISM ARRAY

CROSS-REFERENCE TO RELATED APPLICATIONS

This application claims the benefit under 35 U.S.C. §119(a) of Korean Patent Application No. 10-2012-0014406, filed on Feb. 13, 2012, in the Korean Intellectual Property Office, the disclosure of which is incorporated herein by reference for all purposes.

BACKGROUND

1. Field

The following description relates to changeable liquid prism arrays and methods of manufacturing the changeable liquid prism arrays.

2. Description of the Related Art

According to electrowetting technology, a hydrophobic insulating material is coated on an electrode, and a conductive liquid and a non-conductive liquid contact each other on the hydrophobic insulating material. A voltage is applied to control a surface tension of the conductive liquid so that a contact angle of the conductive liquid and an interfacial shape between the two liquids are changed. In more detail, when a voltage is applied to the conductive liquid and the non-conductive liquid, a hydrophobic interface of the conductive liquid is changed into a hydrophilic interface, and the contact angle of the conductive liquid is decreased. Thus, the conductive liquid pushes the non-conductive liquid, thereby forming an interface between the conductive liquid and the non-conductive liquid in a prism shape.

In order to drive a changeable liquid prism array using electrowetting technology, electrodes separated from each other may be necessary. However, a process of separating the electrodes is complex, and thus, it is difficult to manufacture the electrodes.

SUMMARY

In one general aspect, there is provided a changeable liquid prism array includes a substrate, a wiring layer formed on the substrate, and including conducting wire portions and non-conducting wire portions where the conducting wire portions are not formed, and barrier walls disposed on the wiring layer. The changeable liquid prism array further includes cells defined by the barrier walls, a first liquid included in the cells, and a second liquid located on the first liquid. The changeable liquid prism array further includes side electrodes disposed on side surfaces of the barrier walls, and separated from each other by spaces corresponding to the non-conducting wire portions, and an upper electrode arranged above the barrier walls, and separated from the side electrodes.

The side electrodes may include first side electrodes formed on first side surfaces of the barrier walls, and second side electrodes formed on second side surfaces of the barrier walls. The first side surfaces and the second side surfaces may face each other, respectively.

The wiring layer may include the conducting wire portions separated from each other by gaps corresponding to gaps between the side electrodes.

The wiring layer may include first conducting wire portions, second conducting wire portions, and third conducting wire portions that are repeatedly formed to be separate from each other. The barrier walls may be formed on some portions of the first conducting wire portions and the third conducting wire portions. The side electrodes may include first side electrodes formed on first side surfaces of the barrier walls corresponding to the first conducting wire portions, and second side electrodes formed on second side surfaces of the barrier walls corresponding to the third conducting wire portions.

The wiring layer may be formed of opaque metal wires. The first liquid may include a non-polar liquid. The second liquid may include a polar liquid.

The first liquid may include oil. The second liquid may include an electrolyte.

A dielectric layer may be formed on the side electrodes, the dielectric layer including a hydrophobic material.

The dielectric layer may be formed on the side electrodes, the dielectric layer exhibiting hydrophilic properties with respect to the first liquid and exhibiting hydrophobic properties with respect to the second liquid.

In another general aspect, there is provided a method of manufacturing a changeable liquid prism array, the method including depositing a metal layer on a substrate, patterning the metal layer to form a wiring layer including conducting wire portions and non-conducting wire portions, and forming barrier walls on the wiring layer. The method further includes depositing an electrode layer on the wiring layer and the barrier walls, depositing a photoresist on the electrode layer, and performing a back exposure from a side of the substrate via the wiring layer. The method further includes developing the photoresist based on a pattern of the wiring layer, etching the electrode layer to form side electrodes, and removing the photoresist.

The method may further include filling a first liquid including a non-polar type in the barrier walls. The method may further include filling a second liquid including a polar type on the first liquid.

The method may further include filling a first liquid including oil in the barrier walls. The method may further include filling a second liquid including an electrolyte on the first liquid.

The method may further include depositing a dielectric layer on the side electrodes, the dielectric layer including a hydrophobic material.

The performing of the back exposure may include using the wiring layer as a mask.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is understood that the features of the disclosure may be embodied in different forms and should not be constructed as limited to the example(s) set forth herein. Rather, example(s) are provided so that this disclosure will be thorough and complete, and will convey the full scope of the disclosure to those skilled in the art. The drawings may not be necessarily to scale, and, in some examples, proportions may have been exaggerated in order to clearly illustrate features of the example(s). When a first layer is referred to as being "on" a second layer or "on" a substrate, it may not only refer to a case where the first layer is formed directly on the second layer or the substrate but may also refer to a case where a third layer exists between the first layer and the second layer or the substrate.

Figure 1:
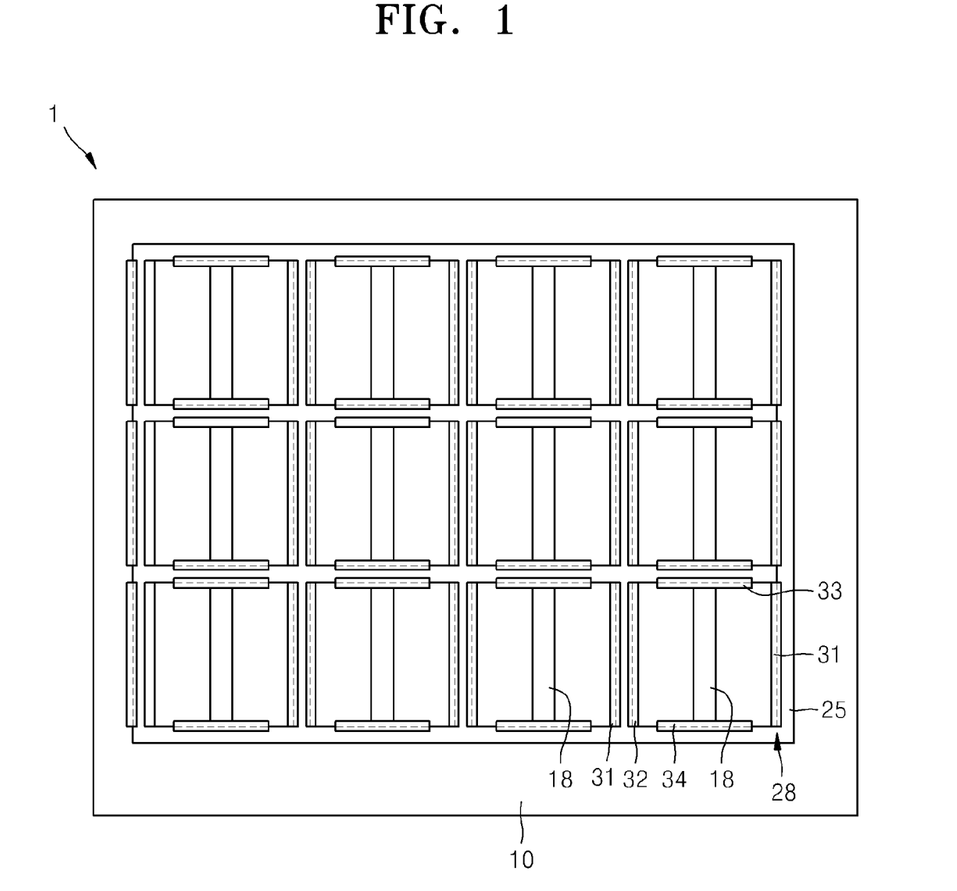
FIG. 1 is a plan view illustrating an example of a changeable liquid prism array.

FIG. 1 is a plan view illustrating an example of a changeable liquid prism array 1. Referring to FIG. 1, the changeable liquid prism array 1 includes a substrate 10, barrier walls 25 arranged on the substrate 10, and cells 28 defined by the barrier walls 25. The cells 28 may be arranged in, for example, a two-dimensional matrix.

Figure 2:
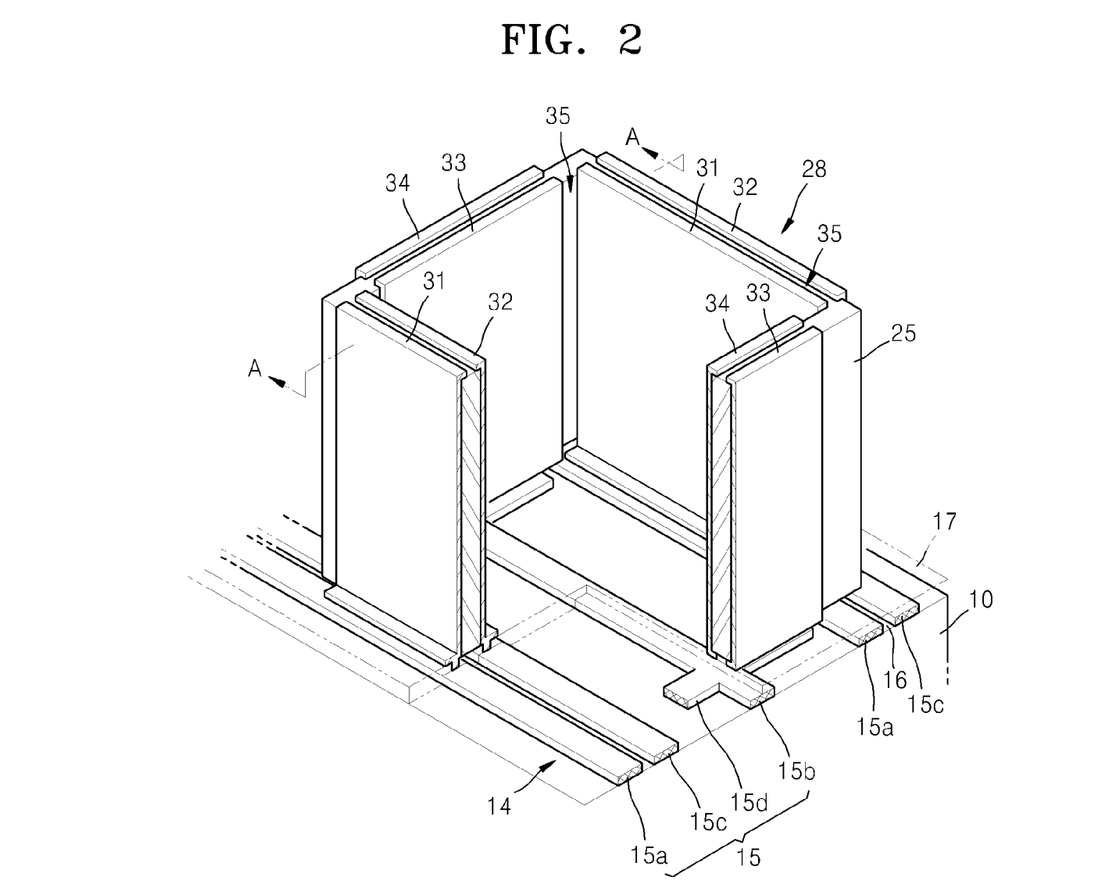
FIG. 2 is a partial perspective view illustrating an example of a cell in the changeable liquid prism array of FIG. 1.

FIG. 2 is a partial perspective view illustrating an example of a cell 28 in the changeable liquid prism array 1 of FIG. 1. Side electrodes are disposed on side walls of the barrier walls 25, and the side electrodes are separated from each other. The side electrodes include, for example, a first side electrode 31 and a second side electrode 32 disposed on facing surfaces of the barrier walls 25, and a third side electrode 33 and a fourth side electrode 34 disposed on other facing surfaces of the barrier walls 25. The first and second side electrodes 31 and 32 and the third and fourth side electrodes 33 and 34 are separated from each other. A wiring layer 14 is disposed between the substrate 10 and the barrier walls 25. The wiring layer 14 includes a conducting wire portion 15 formed of a conductive material, and a non-conducting wire portion 16 where the conducting wire portion 15 is not formed. The conducting wire portion 15 may be formed of, for example, opaque metal, such as gold, silver, copper, aluminum, molybdenum, chrome, titanium, tungsten, tantalum, magnesium, ruthenium, and an alloy or a compound of these metals.

Figure 3:
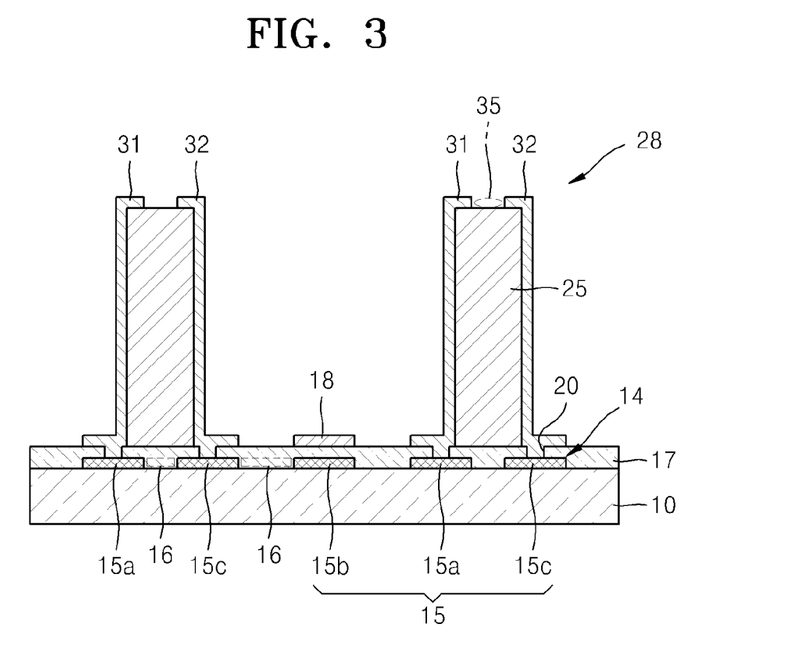
FIG. 3 is a partial cross-sectional view illustrating an example of the cell in the changeable liquid prism array of FIG. 1.

FIG. 3 is a partial cross-sectional view illustrating an example of the cell 28 in the changeable liquid prism array 1 of FIG. 1. The cross-sectional view is taken along line A-A of FIG. 2. An insulating layer 17 is deposited to cover the wiring layer 14. The insulating layer 17 includes penetration holes 20 formed through the insulating layer 17 to the conducting wire portion 15. Thus, the conducting wire portion 15 is electrically connected to the first and second side electrodes 31 and 32 and the third and fourth side electrodes 33 and 34 of FIGS. 1-2 via the penetration holes 20.

The first and second side electrodes 31 and 32 and the third and fourth side electrodes 33 and 34 of FIGS. 1-2 are not disposed on an upper portion of the non-conducting wire portion 16. That is, the first and second side electrodes 31 and 32 and the third and fourth side electrodes 33 and 34 are disposed on regions corresponding to the conducting wire portion 15. In addition, the non-conducting wire portion 16 correspond to a separation area between the first and second side electrodes 31 and 32, and between the third and fourth side electrodes 33 and 34.

Figure 4:
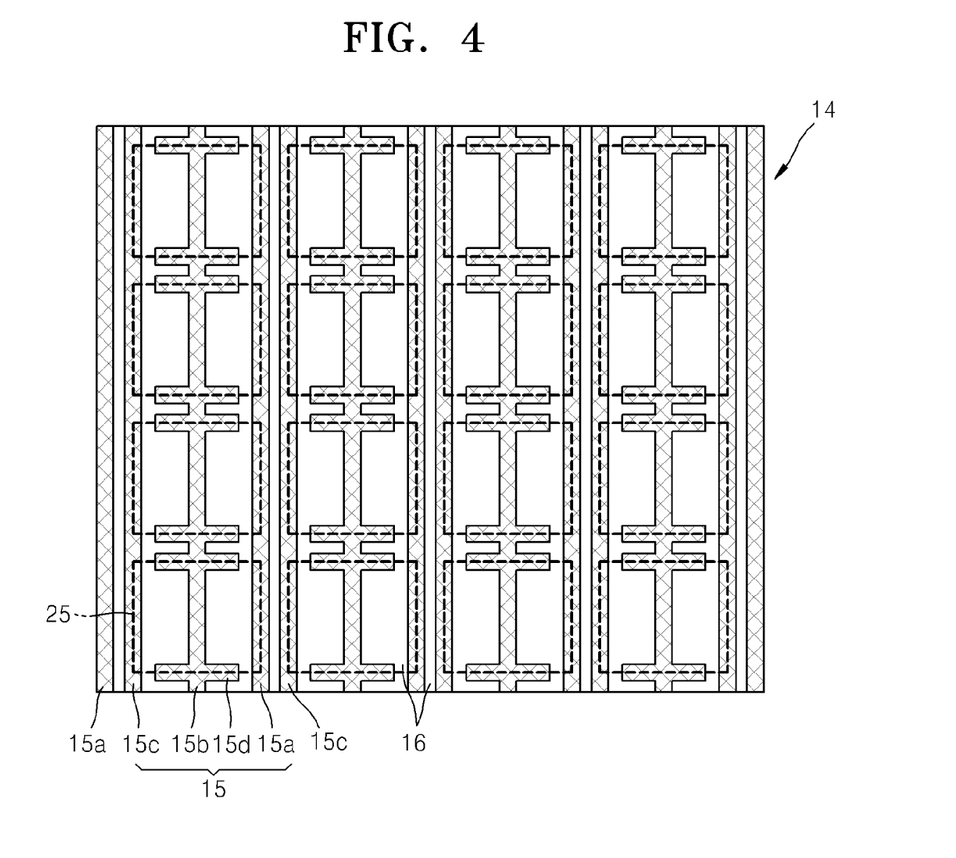
FIG. 4 is a plan view illustrating an example of a pattern in a wiring layer in the changeable liquid prism array of FIG. 1.

FIG. 4 is a plan view illustrating an example of a pattern in the wiring layer 14 in the changeable liquid prism array of FIG. 1. Referring to FIG. 4, the conducting wire portion 15 includes a first conducting wire portion 15a, a second conducting wire portion 15b, and a third conducting wire portion 15c that are arranged to be separate from each other on the substrate 10. In addition, the conducting wire portion 15 includes fourth conducting wire portions 15d that cross the second conducting wire portion 15b and do not meet the first and third conducting wire portions 15a and 15c. The second conducting wire portion 15b connects the fourth conducting wire portions 15d to each other. The first side electrode 31 of FIGS. 1-3 is connected to the first conducting wire portion 15a, the second side electrode 32 of FIGS. 1-3 is connected to the third conducting wire portion 15c, and the third and fourth side electrodes 33 and 34 of FIGS. 1-2 are connected to the fourth conducting wire portions 15d.

Referring again to FIG. 3, a relation is shown between the conducting wire portion 15a of the wiring layer 14 and the first through fourth side electrodes 31 through 34. The first side electrode 31 is disposed to correspond to the first conducting wire portion 15a, and the second side electrode 32 is disposed to correspond to the third conducting wire portion 15c. Accordingly, the first and second side electrodes 31 and 32 correspond to portions extending upward from the conducting wire portions 15a and 15c, respectively. A connecting electrode 18 connecting the third and fourth side electrodes 33 and 34 of FIGS. 1-2 to each other is formed on a portion corresponding to the second conducting wire portion 15b.

In addition, a separation space 35 between the first side electrode 31 and the second side electrode 32 existing in a neighboring cell corresponds to the non-conducting wire portion 16 between the neighboring first and third conducting wire portions 15a and 15c. As described above, the first through fourth side electrodes 31 through 34 are disposed corresponding to the pattern of the wiring layer 14. Accordingly, since the first and third conducting wire portions 15a and 15c are separated from the fourth conducting wire portion 15d, as shown in FIG. 4, the corresponding first and second side electrodes 31 and 32 are separated from the corresponding third and fourth side electrodes 33 and 34 of FIGS. 1-2 with the separation space 35 therebetween.

Figure 5:
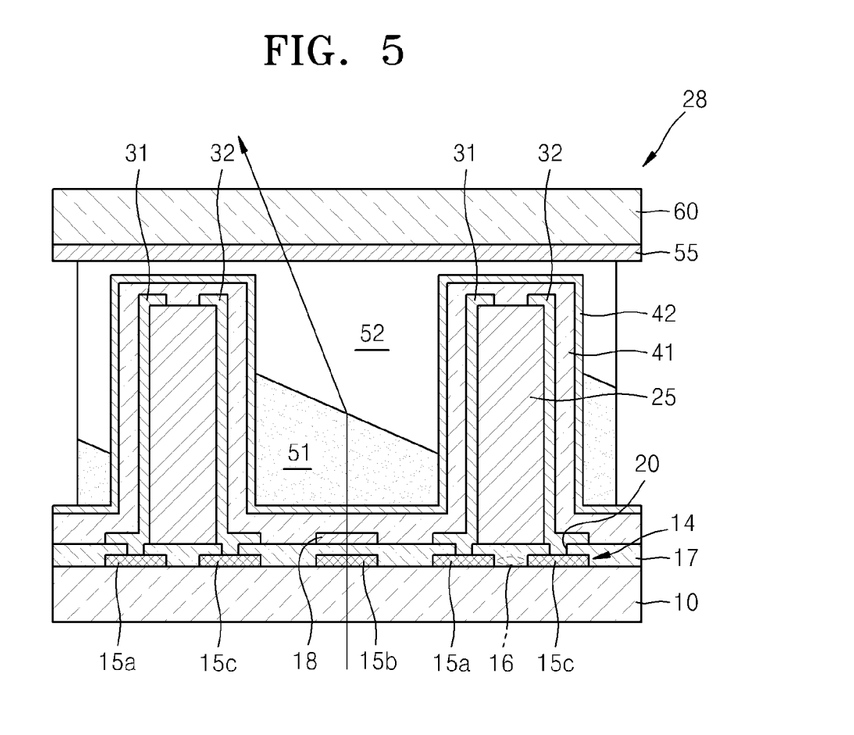
FIG. 5 is a cross-sectional view illustrating an example of the cell in the changeable liquid prism array of FIG. 1.

FIG. 5 is a cross-sectional view illustrating an example of the cell 28 in the changeable liquid prism array of FIG. 1. In more detail, FIG. 5 shows a state where a liquid is filled in the cell 28 shown in FIG. 3. Referring to FIG. 5, a first dielectric layer 41 and a second dielectric layer 42 are stacked on the first through fourth side electrodes 31 through 34 and the insulating layer 17. The first dielectric layer 41 may be formed as, for example, an oxide layer (such as silicon oxide ($SiO_2$), aluminum oxide ($Al_2O_3$), hafnium oxide ($HfO_2$), titanium oxide ($TiO_2$), zirconium oxide ($ZrO_2$), tantalum oxide ($Ta_2O_5$), $HfSiO_4$, $La_2O_3$, $Y_2O_3$, $LaAlO_3$, BaO, MgO, CaO, SrO, $ZrSiO_4$, and $ScTiO_3$), a nitride layer (such as silicon nitride ($Si_3N_4$) and aluminum nitride (AlN)), a carbide layer (such as silicon carbide (SiC), diamond, and diamond-like carbon (DLC)), or a combination layer of any of the above materials. The second dielectric layer 42 includes a hydrophobic material. The second dielectric layer 42 may be formed of, for example, fluoropolymer, such as parylene, Teflon, and Cytop. The first through fourth side electrodes 31 through 34 are electrically insulated by at least one of the first and second dielectric layers 41 and 42.

A first liquid 51 is filled in a lower portion of the barrier walls 25, and a second liquid 52 is filled on the first liquid 51. The first liquid 51 and the second liquid 52 may include two kinds of liquid that are not mixed with each other. For example, the first liquid 51 may include a non-polar liquid, and the second liquid 52 may include a polar liquid. The first liquid 51 may include, e.g., oil, and the second liquid 52 may include, e.g., an electrolyte. For example, the second liquid 52 may include water or salt water. Since the second dielectric layer 42 includes a hydrophobic material, the barrier walls 25 are hydrophilic with respect to the first liquid 51, and are hydrophobic with respect to the second liquid 52. That is, the second dielectric layer 42 exhibits hydrophilic properties with respect to the first liquid 51, and exhibits hydrophobic properties with respect to the second liquid 52.

On the other hand, a second substrate 60 is disposed above and separate from the barrier walls 25 and the first through fourth side electrodes 31 through 34. Between the barrier walls 25 and the second substrate 60, the barrier walls 25 do not block the cells 28 from each other by the barrier walls 25, and thus, the cells 28 share the second liquid 52. An upper electrode 55 is disposed on a lower surface of the second substrate 60. Alternatively, only the upper electrode 55 may be disposed above and separate from the barrier walls 25, without forming the second substrate 60.

The first and second substrates 10 and 60 may be transparent substrates to transmit light. In addition, the first through fourth side electrodes 31 through 34 and the upper electrode 55 may be transparent electrodes.

The changeable liquid prism array shown in FIG. 5 may change an interface between the first liquid 51 and the second liquid 52 to a prism type via an electrowetting method. When an inclination of the interface between the first and second liquids 51 and 52 is changed, a prism angle of the interface is changed. Each of the cells 28 in the changeable liquid prism array is formed in a square in FIG. 1; however, the examples are not limited thereto. That is, each of the cells 28 may be formed in various shapes, for example, a cylinder and an octagonal pillar. Alternatively, each of the cells 28 may be formed in a quadrangle, in which a side is longer than the other side, and may function as a cylindrical prism when the interface between the first liquid 51 and the second liquid 52 is changed to the prism type.

In more detail, when voltages are applied to the first through fourth side electrodes 31 through 34 and the upper electrode 55, an electrowetting of the second liquid 52 that is conductive is performed on surfaces of the barrier walls 25, and accordingly, the inclination of the interface between the first liquid 51 and the second liquid 52 may be changed. Accordingly, the interface may be changed to the prism type. An amount of liquid in each of the cells 28 may affect a prism shape of the interface and the electrowetting of the second liquid 52. Therefore, the liquid is filled evenly throughout the cells 28, and characteristics of the interface between the first and second liquids 51 and 52 in each of the cells 28 may be uniform.

Figure 6:
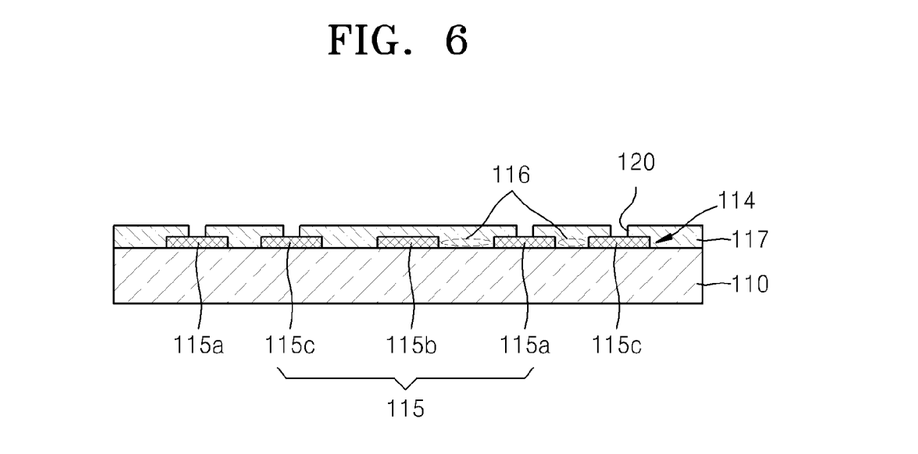
FIGS. 6 through 12 are diagrams illustrating an example of a method of manufacturing a changeable liquid prism array.

FIGS. 6 through 12 are diagrams illustrating an example of a method of manufacturing a changeable liquid prism array. Referring to FIG. 6, a metal layer is formed on a first substrate 110, and is patterned to form a wiring layer 114 including a conducting wire portion 115 and a non-conducting wire portion 116. The wiring layer 114 is used as a mask to form side electrodes described below, as well as a current supply path. Therefore, the wiring layer 114 is formed to include a pattern that is the same as that of the side electrodes.

Figure 7:
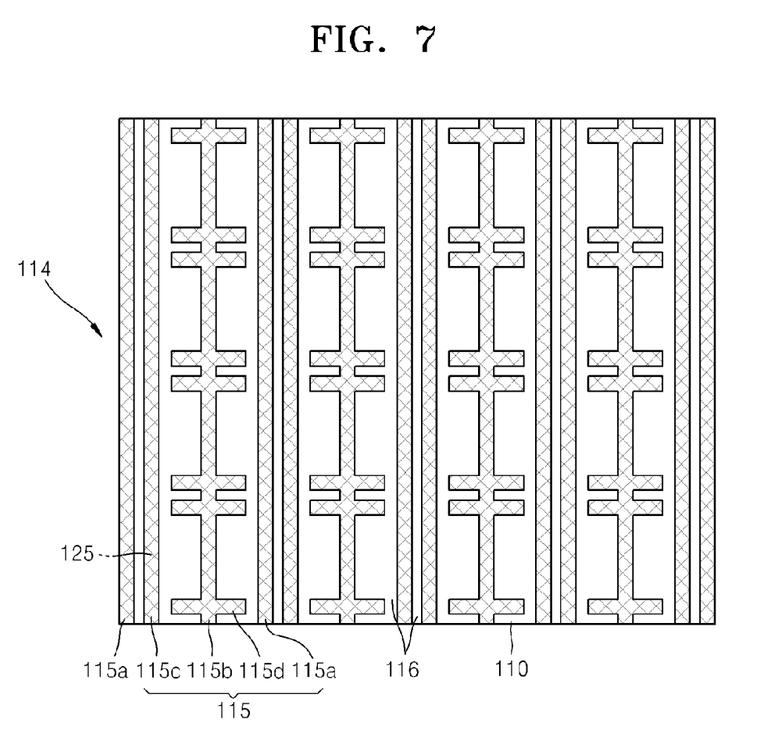

FIG. 7 is a plan view illustrating an example of the wiring layer 114. The conducting wire portion 115 includes a first conducting wire portion 115a, a second conducting wire portion 115b, and a third conducting wire portion 115c that are separated from each other. In addition, the conducting wire portion 115 includes fourth conducting wire portions 115d arranged at a predetermined interval to cross the second conducting wire portion 115b. However, the fourth conducting wire portions 115d do not contact the first and third conducting wire portions 115a and 115c.

Referring again to FIG. 6, an insulating layer 117 is deposited on the wiring layer 114. In addition, the insulating layer 117 is patterned to form penetration holes 120 through the insulating layer 117 to the conducting wire portion 115.

Figure 8:
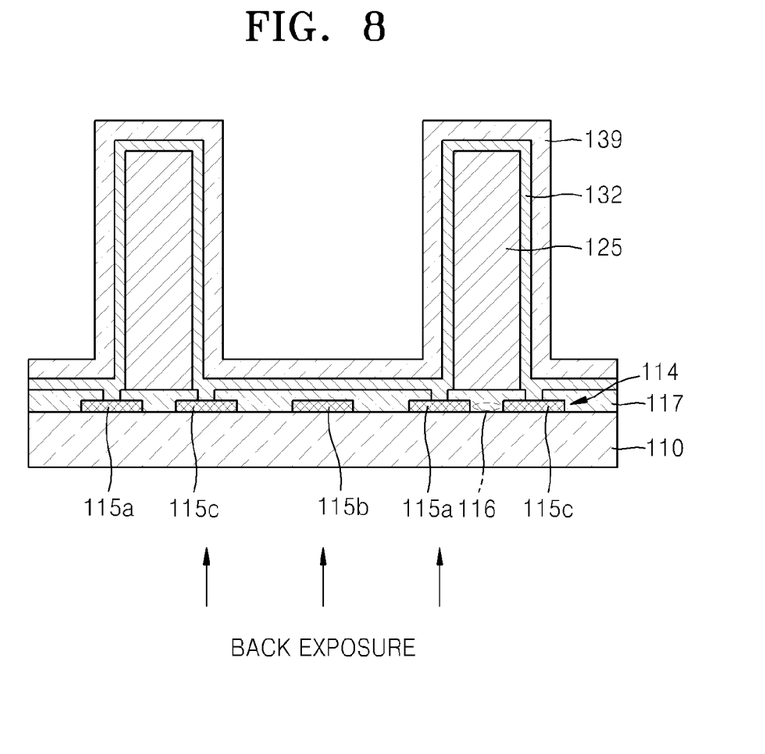

Referring to FIGS. 7-8, barrier walls 125 are formed on the insulating layer 117 above spaces between the neighboring first and third conducting wire portions 115a and 115c, and above spaces between the neighboring fourth conducting wire portions 115d. The barrier walls 125 may be formed by stacking a barrier wall layer on the insulating layer 117, and patterning the barrier wall layer based on patterns of the first and third conducting wire portions 115a and 115c and the fourth conducting wire portions 115d. In examples, the barrier walls 125 may be patterned using a polymer, such as SU-8, or may be electroplated by a metal using a mold. The barrier walls 125 may include rectangular cross-sections or other various cross-sectional shapes known to one of ordinary skill in the art.

Referring to FIG. 8, the barrier walls 125 do not cover entire portions of the neighboring first and third conducting wire portions 115a and 115c. That is, at least some portions of the first and third conducting wire portions 115a and 115c are located beyond widths of the barrier walls 125. In addition, the barrier walls 125 do not block the penetration holes 120. An electrode layer 132 is deposited on the barrier walls 125 and the insulating layer 117. A photoresist 139 of, for example, a positive type is deposited on the electrode layer 132. Next, a back exposure is performed from a side of the first substrate 110 through the wiring layer 114. The conducting wire portion 115 of FIGS. 6-7 of the wiring layer 114 is formed of metal, and the wiring layer 114 functions as a mask in the back exposure process. Therefore, an additional mask is not necessary, and manufacturing processes may be simplified, costs for the additional mask may not be necessary, and there is less possibility of mask misalignment.

Figure 9:
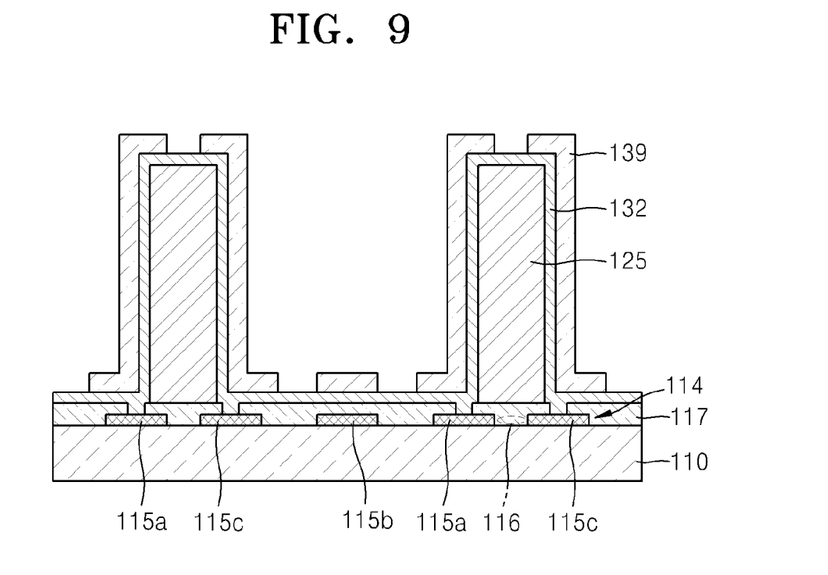

Referring to FIG. 9, since the wiring layer 114 functions as the mask, the photoresist 139 is developed based on the pattern of the wiring layer 114. That is, the photoresist 139 is patterned to include spaces corresponding to the non-conducting wire portion 116 of the wiring layer 114.

Figure 10:
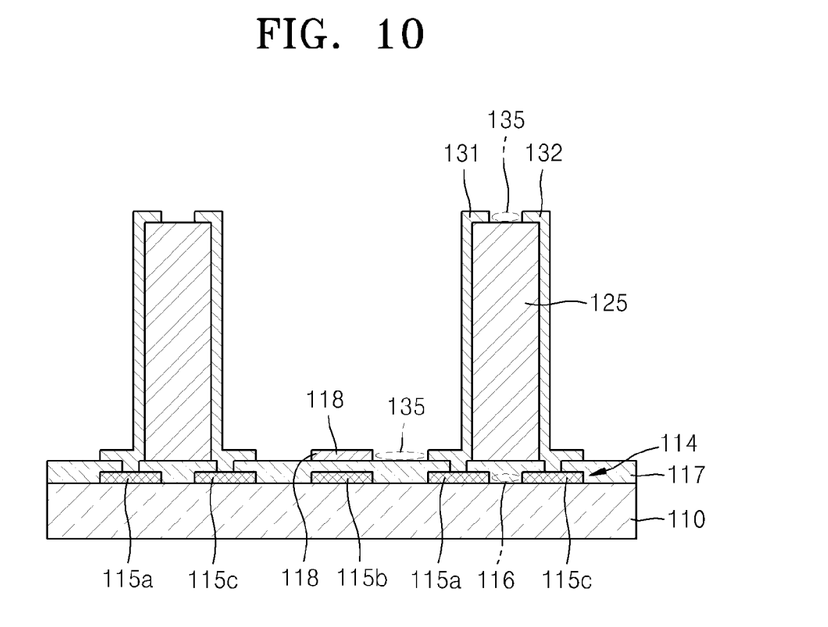

Referring to FIG. 10, the electrode layer 132 is etched based on the photoresist 139 to form a first side electrode 131 and a second side electrode 132 on facing side surfaces of the barrier walls 125, and a connecting electrode 118. The first and second side electrodes 131 and 132 are separated from each other based on the patterns of the first and third conducting wire portions 115a and 115c. That is, a separation space 135 between the first and second side electrodes 131 and 132 corresponds to the non-conducting wire portion 116 between the first and third conducting wire portions 115a and 115c. The connecting electrode 118 is formed based on a portion corresponding to the second conducting wire portion 115b. That is, a separation space 135 between the first side electrode 131 and the connecting electrode 118 corresponds to the non-conducting wire portion 116 between the first and second conducting wire portions 115a and 115b. The photoresist 139 of FIG. 9 is removed after etching the electrode layer 132.

Figure 11:
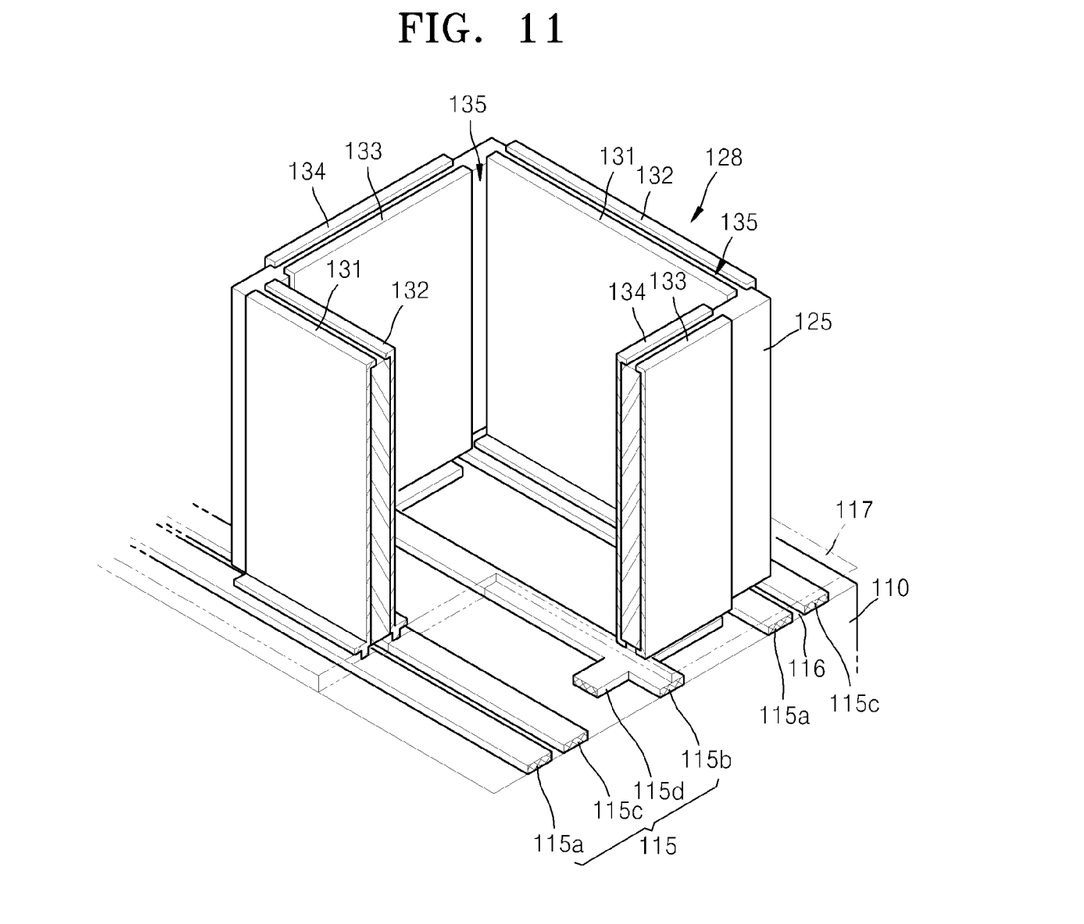

FIG. 11 is a partial perspective view illustrating an example of a cell 128 in the changeable liquid prism array. Referring to FIG. 11, a third side electrode 133 and a fourth side electrode 134 are formed on other facing side surfaces of the barrier walls 125. The third and fourth side electrodes 133 and 134 are separated from each other based on the pattern of the fourth conducting wire portions 115d, and are separated from the first and second side electrodes 131 and 132.

Figure 12:
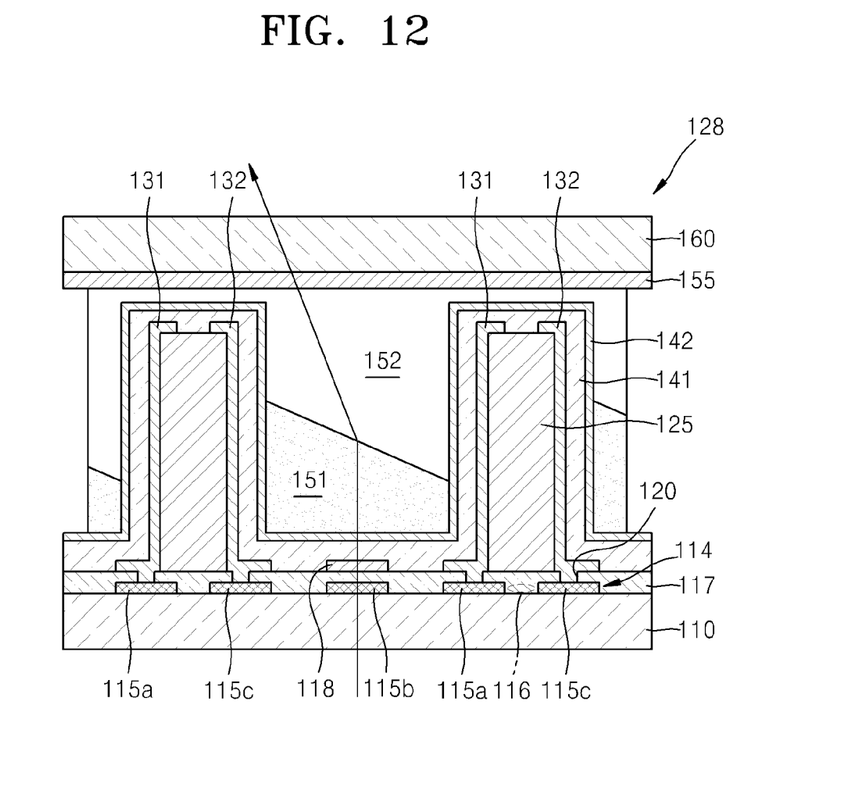

Referring to FIG. 12, a first dielectric layer 141 and a second dielectric layer 142 are deposited on the first through fourth side electrodes 131 through 134 and the insulating layer 117. At least one of the first and second dielectric layers 141 and 142 includes a hydrophobic material. If the first dielectric layer 141 includes the hydrophobic material, there is no need to form the second dielectric layer 142. In this example, the first dielectric layer 141 functions as both an insulating layer and a hydrophobic layer.

A first medium 151 and a second medium 152 including refractive indexes different from each other are filled between the first through fourth side electrodes 131 through 134. For example, the first medium 151 may be a non-polar liquid, such as oil, and the second medium 152 may be a polar liquid, such as water. An interface between the first medium 151 and the second medium 152 may be a refractive surface, e.g., of a lens or a prism. The third and fourth side electrodes 133 and 134 may operate as common electrodes. An inclination of the interface between the first medium 151 and the second medium 152 may vary based on a voltage applied between the first and second side electrodes 131 and 132.

An upper electrode 155 is formed above and separated from the barrier walls 125 and the first through fourth side electrodes 131 through 134, and a second substrate 160 may be formed on the upper electrode 155. The upper electrode 155 may operate as a ground electrode.

As described above, the back exposure is performed using the wiring layer 114 as the mask to form the side electrodes. Therefore, there is no need to use an additional mask, manufacturing costs may be reduced, and manufacturing processes may be simplified. In addition, a possibility of generating a location error of the side electrodes due to mask misalignment is reduced. Further, since the side electrodes are formed by the back exposure, there is a small difference between sizes of upper and lower portions of the side electrodes. Moreover, conventional exposure equipment may be used.

According to the teachings above, there is provided a changeable liquid prism array, and a method of manufacturing the changeable liquid prism array, which may be applied to a stereoscopic image display to adjust an exit direction of light. For example, when a voltage is applied to the changeable liquid prism array so that an interface between a first liquid and a second liquid in the changeable liquid prism array is flat with no inclination, light transmits through the first and second liquids to display a two-dimensional image. When an appropriate voltage is applied so that the interface between the first and the second liquids forms a lens or a prism, a three-dimensional image is displayed. Alternatively, the changeable liquid prism array may be used in an optical analysis apparatus attached to a multiple cell plate for a biochemical experiment to simultaneously observe optical changes of cells.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A changeable liquid prism array comprising:
a substrate;
a wiring layer formed on the substrate, and comprising: conducting wire portions, and non-conducting portions wherein the conducting wire portions are not formed;
barrier walls disposed on the wiring layer;
cells defined by the barrier walls;
a first liquid included in the cells;
a second liquid located on the first liquid;
side electrodes disposed on side surfaces of the barrier walls; and
an upper electrode arranged above the barrier walls, and separated from the side electrodes;
wherein electricity is supplied to the side electrodes through the conducting wire portions, and the side electrodes are disposed depending on the position of the conducting wire portions and the non-conducting portions; and
wherein the side electrode is separated from another side electrode by a space corresponding to about a width of a non-conducting portion, among the non-conducting portions, under the barrier wall.

2. The changeable liquid prism array of claim 1, wherein:
the side electrodes comprise first side electrodes formed on first side surfaces of the barrier walls, and second side electrodes formed on second side surfaces of the barrier walls; and
the first side surfaces and the second side surfaces face each other, respectively.

3. The changeable liquid prism array of claim 1, wherein:
the wiring layer comprises the conducting wire portions separated from each other by gaps corresponding to gaps between the side electrodes.

4. The changeable liquid prism array of claim 1, wherein:
the wiring layer comprises first conducting wire portions, second conducting wire portions, and third conducting wire portions that are repeatedly formed to be separate from each other;
the barrier walls are formed on some portions of the first conducting wire portions and the third conducting wire portions; and
the side electrodes comprises first side electrodes formed on first side surfaces of the barrier walls corresponding to the first conducting wire portions, and second side electrodes formed on second side surfaces of the barrier walls corresponding to the third conducting wire portions.

5. The changeable liquid prism array of claim 1, wherein:
the wiring layer is formed of opaque metal wires.

6. The changeable liquid prism array of claim 1, wherein:
the first liquid comprises a non-polar liquid; and
the second liquid comprises a polar liquid.

7. The changeable liquid prism array of claim 1, wherein:
the first liquid comprises oil; and
the second liquid comprises an electrolyte.

8. The changeable liquid prism array of claim 1, further comprising:
a dielectric layer formed on the side electrodes, the dielectric layer comprising a hydrophobic material.

9. The changeable liquid prism array of claim 1, further comprising:
a dielectric layer formed on the side electrodes, the dielectric layer exhibiting hydrophilic properties with respect to the first liquid and exhibiting hydrophobic properties with respect to the second liquid.

10. The changeable liquid prism array of claim 1, wherein:
the side electrodes are separated from each other corresponding to the non-conducting portions.

* * * * *